(12) United States Patent
Feng

(10) Patent No.: US 11,357,357 B2
(45) Date of Patent: Jun. 14, 2022

(54) FOLDING GRILL STAND STRUCTURE WITH HIGH STORAGE CONVENIENCE

(71) Applicant: Fu-Du Feng, Taipei (TW)

(72) Inventor: Fu-Du Feng, Taipei (TW)

( * ) Notice: Subject to any disclaimer, the term of this patent is extended or adjusted under 35 U.S.C. 154(b) by 643 days.

(21) Appl. No.: 16/297,220

(22) Filed: Mar. 8, 2019

(65) Prior Publication Data

US 2020/0221903 A1 Jul. 16, 2020

(30) Foreign Application Priority Data

Jan. 16, 2019 (TW) ................................ 108200762

(51) Int. Cl.
*A47J 37/07* (2006.01)

(52) U.S. Cl.
CPC .... *A47J 37/0786* (2013.01); *A47J 2037/0777* (2013.01)

(58) Field of Classification Search
CPC ... A47B 2003/006; A47B 3/0803; A47B 3/12; A47B 2001/005; F16M 2200/024; F16M 11/38; A47J 37/0786; A47J 2037/0777
USPC .............. 108/124, 127, 128, 157.18, 159.12; 248/167
See application file for complete search history.

(56) References Cited

U.S. PATENT DOCUMENTS

| | | | | |
|---|---|---|---|---|
| 587,219 A * | 7/1897 | Maes et al. | ............ | F16M 11/00 248/150 |
| 831,268 A * | 9/1906 | Edick et al. | ............ | F16M 11/00 248/150 |
| 967,695 A * | 8/1910 | Whitney | ............... | A47B 13/081 108/62 |
| 991,644 A * | 5/1911 | Quinlan | .................... | G10G 5/00 248/167 |
| 1,067,223 A * | 7/1913 | Kjelsoe | .................... | G10G 5/00 248/167 |
| 1,375,635 A * | 4/1921 | Johnson | .................. | E05D 7/081 16/329 |
| 1,529,840 A * | 3/1925 | Magel | ....................... | D06F 1/00 248/167 |
| 1,603,409 A * | 10/1926 | Rickenbacher | ......... | E05C 17/38 16/332 |
| 1,939,904 A * | 12/1933 | Koopman | ................ | A47B 3/12 108/157.18 |

(Continued)

FOREIGN PATENT DOCUMENTS

WO WO-2005025376 A1 * 3/2005 ............. A47B 3/002

*Primary Examiner* — Jorge A Pereiro
(74) *Attorney, Agent, or Firm* — Juan Carlos A. Marquez; Marquez IP Law Office, PLLC

(57) ABSTRACT

A folding grill stand structure with high storage convenience is revealed. The grill stand includes a first support, a second support, a third support and a plurality of lateral supports. Each first horizontal rod of the first support includes a first side surface and a second side surface. A first end portion and a second end portion of each second horizontal rod of the second support are connected to the first side surface in a foldable manner by a first rotating shaft and a first bolt respectively. A third end portion and a fourth end portion of each third horizontal rod are connected to the second side surface in a foldable manner by a second rotating shaft and a second bolt respectively. The lateral supports are formed on an end portion of the outer side of the first, the second and the third supports respectively.

2 Claims, 12 Drawing Sheets

(56) References Cited

U.S. PATENT DOCUMENTS

| | | | | |
|---|---|---|---|---|
| 2,048,608 A * | 7/1936 | Holland | ............... | D06F 39/125 |
| | | | | 248/150 |
| 2,971,803 A * | 2/1961 | Wallin | ................ | A47B 3/0815 |
| | | | | 16/326 |
| 3,000,679 A * | 9/1961 | Silverman | ............. | A47B 13/06 |
| | | | | 248/167 |
| 3,312,355 A * | 4/1967 | Steinmetz | ............. | A47B 13/06 |
| | | | | 211/189 |
| 3,695,457 A * | 10/1972 | Cohen | ....................... | A47F 5/13 |
| | | | | 211/189 |
| 4,763,866 A * | 8/1988 | Sinchok | ................... | A47F 5/04 |
| | | | | 248/188.7 |
| 6,032,588 A * | 3/2000 | Williamson | ............ | A47B 1/04 |
| | | | | 108/66 |
| 7,252,271 B2 * | 8/2007 | Stephens | ................. | A63G 1/12 |
| | | | | 248/166 |
| 2011/0283990 A1 * | 11/2011 | Walters | .............. | A47J 37/0759 |
| | | | | 126/25 R |

\* cited by examiner

FOLDING GRILL STAND STRUCTURE WITH HIGH STORAGE CONVENIENCE

BACKGROUND OF THE INVENTION

1. Technical Field

The present invention relates to a folding grill stand, especially to a folding grill stand structure with high storage convenience used for outdoor grilling during a celebration with family members or friends.

2. Description of Related Art

Grilling, probably the most primitive way of cooking food for humans, is to heat and dry the air with fuels and place the food in hot dry air near a heat source to heat the food. Generally, grilling is to place food is set over a fire and cook the food thoroughly. In modern society, there are various ways through which the fire is started so that there are increasingly diverse types of grilling. Various kinds of barbecue grills/vessels, grill stands, barbecue sauces have been developed. The grilling has become a type of social event, leisure or business.

As shown in FIG. 1, a conventional grill stand P 100 is revealed. The fixed design renders the grill stand P100 unable to be folded and causes inconvenience in manufacturing, warehouse, transportation and storage after use. Moreover, an outer support P10 of the grill stand P100 is also fixed. Thus a vessel that weights tens of kilograms is raised to a desired height for being held by the fixed outer support P10. Not only the height, the difficulty and the risk during the movement of the vessel are also increased. The fixed support is unable to be applied to vessels in different sizes. Thus there is room for improvement and there is a need to provide a novel grill stand.

SUMMARY OF THE INVENTION

Therefore it is a primary object of the present invention to provide a folding grill stand structure with high storage convenience to save space during manufacturing, warehouse, transportation and storage. Moreover, the grill stand is able to be used together with vessels in different seizes, allowing the placement of the grill more power-saving, safer and easier.

This present invention provides a folding grill stand structure with high storage convenience comprising: a first support having one set of first horizontal rods each of which includes a first side surface and a second side surface; a second support that includes one set of second horizontal rods; each of the second horizontal rods having a first end portion and a second end portion while the first end portion and the second end portion are connected to the first side surface in a foldable manner by a first rotating shaft and a first bolt respectively; a third support having one set of third horizontal rods each of which includes a third end portion and a fourth end portion while the third end portion and the fourth end portion are connected to the second side surface in a foldable manner by a second rotating shaft and a second bolt respectively; and a plurality of lateral supports that is disposed on an end portion of the outer side of the first support, the second support and the third support in a one-to-one manner.

This present invention further provides a folding grill stand structure with high storage convenience comprising: a first support having a first rack and a second rack, both provided with one set of first horizontal rods respectively; a second support including one set of second horizontal rods; a third support including one set of third horizontal rods; a pair of cross joints each of which is composed of a pair of first joints, a second joint and a third joint that are integrally connected to the first horizontal rods, the second horizontal rods and the third horizontal rods in a pluggable manner respectively; and a plurality of lateral supports that is disposed on an end portion of the outer side of the first rack, the second rack, the second support and the third support in a one-to-one manner.

Implementation of the present invention at least produces the following advantageous effects:
1. The problem of the space during manufacturing, warehouse, transportation and storage after use can be solved effectively.
2. The grill stand can be used in combination with vessels in different sizes.
3. The placement of the vessel is more power-saving, safer and easier.

The features and advantages of the present invention are detailed hereinafter with reference to the preferred embodiments. The detailed description is intended to enable a person skilled in the art to gain insight into the technical contents disclosed herein and implement the present invention accordingly. In particular, a person skilled in the art can easily understand the objects and advantages of the present invention by referring to the disclosure of the specification, the claims, and the accompanying drawings.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE INVENTION

Figure 1:
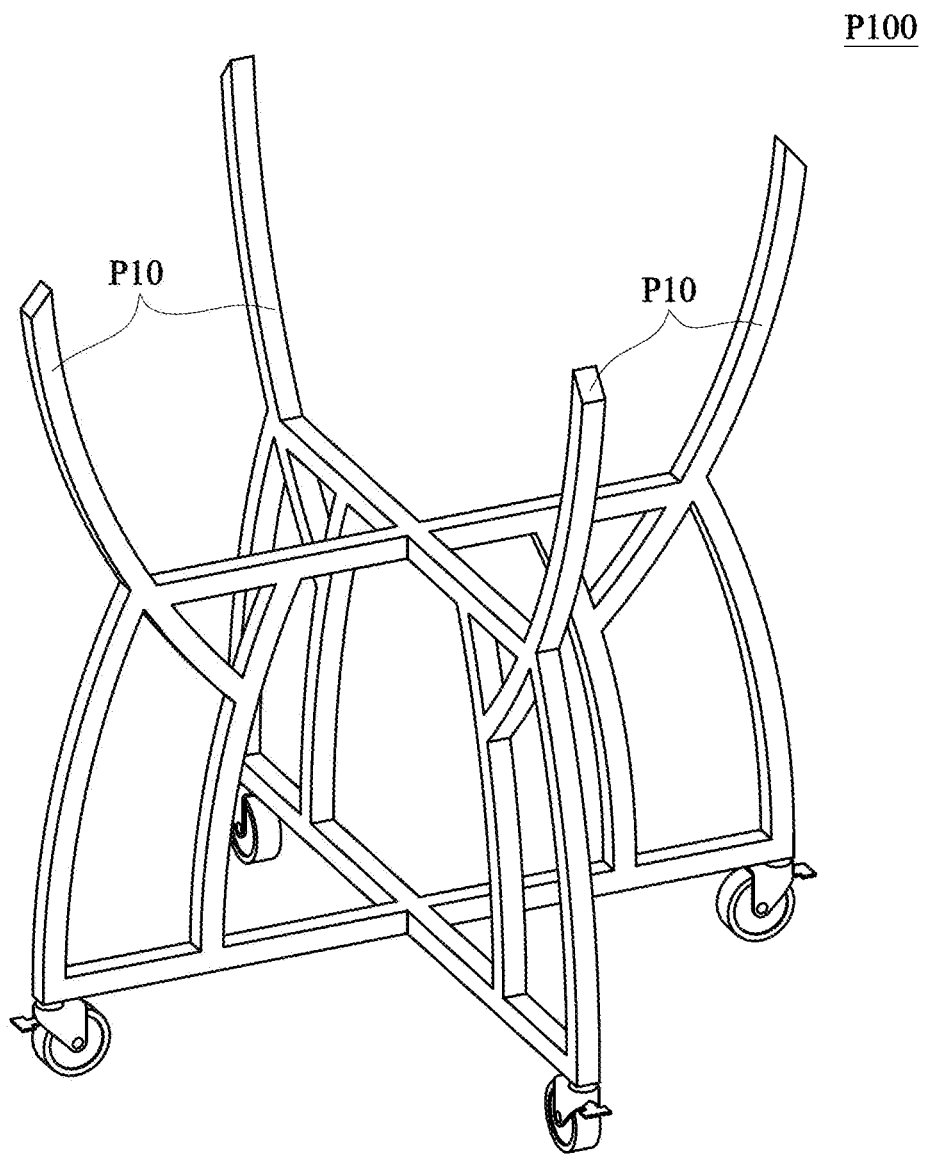
FIG. 1 is a perspective view of a prior art of a grill stand.
Figure 2:
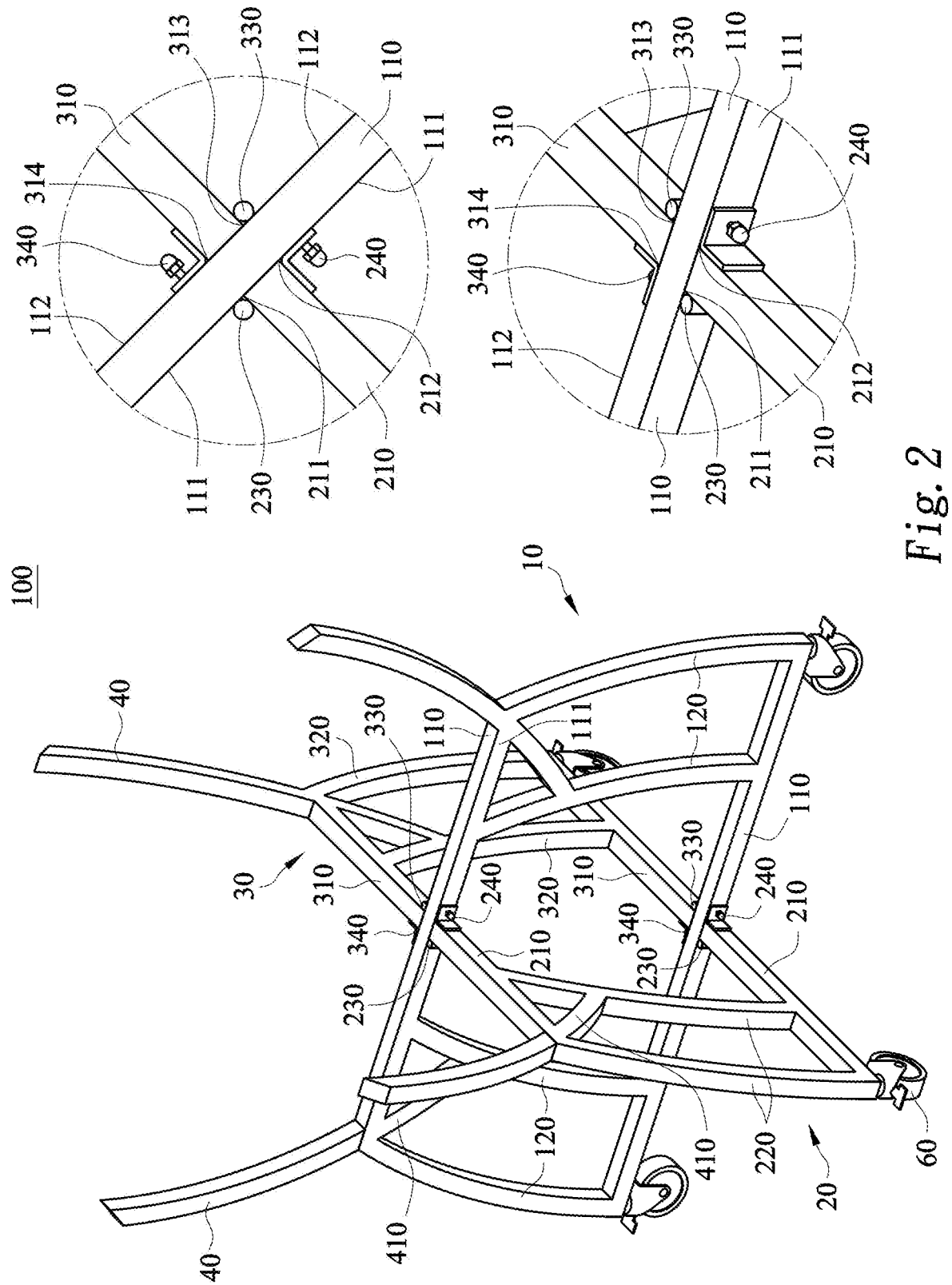
FIG. 2 is a perspective view of an embodiment of a folding grill stand structure with high storage convenience according to the present invention.
Figure 3:
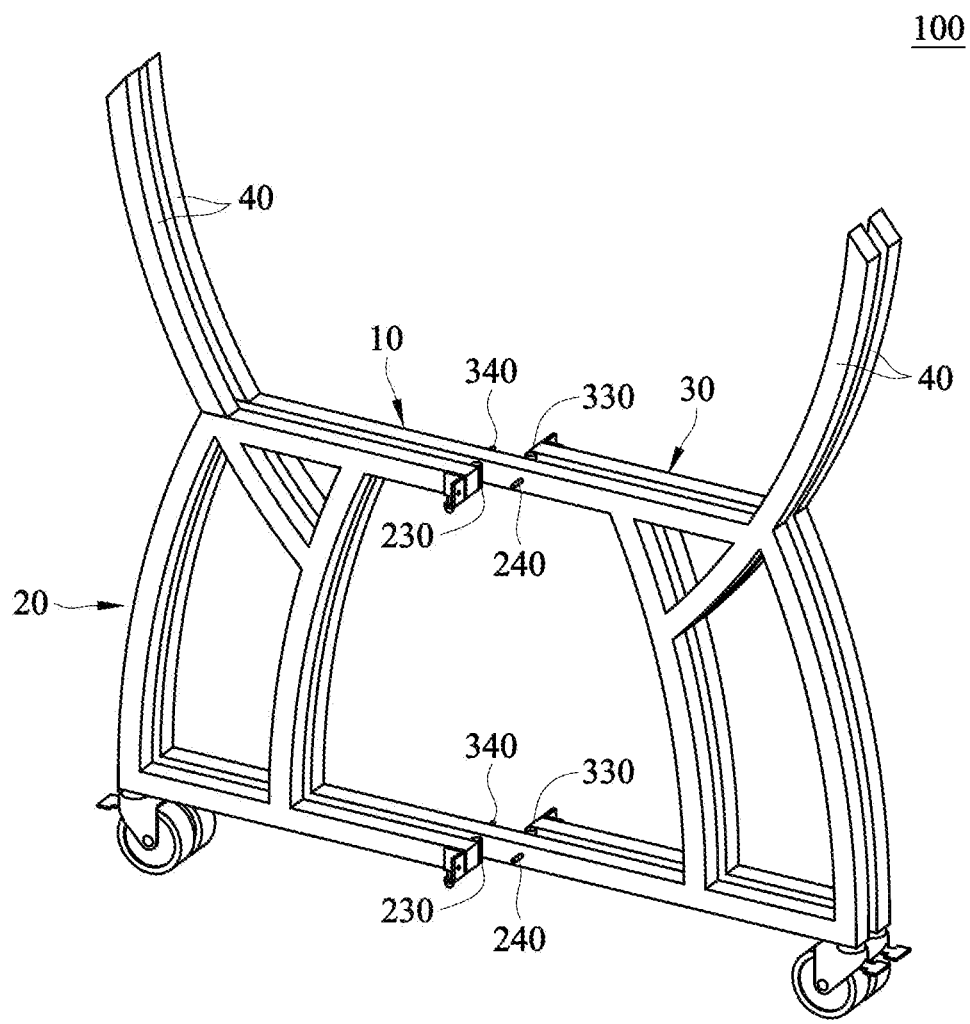
FIG. 3 is a schematic drawing showing the embodiment in FIG. 2 that folds flat according to the present invention.
Figure 4:
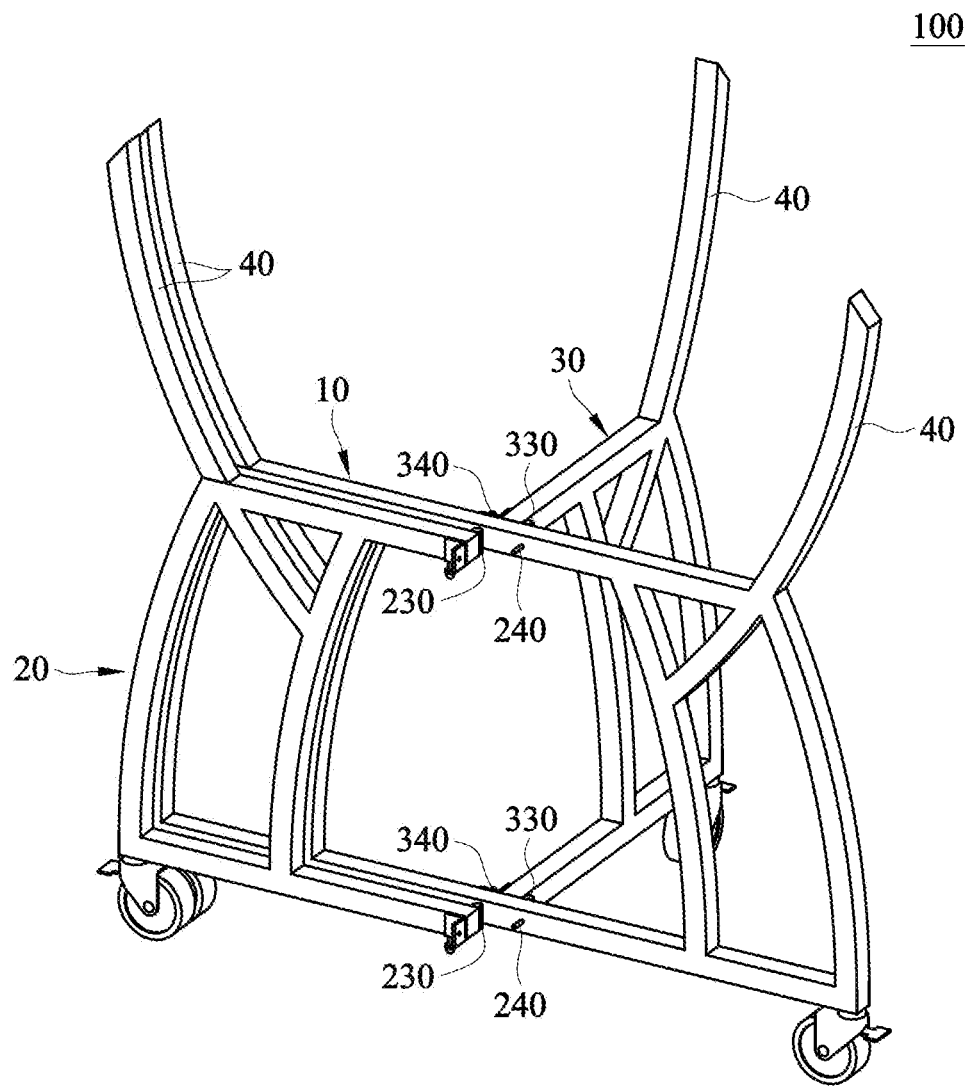
FIG. 4 is a schematic drawing showing the embodiment in FIG. 2 in which a second support is extended according to the present invention.

Refer to FIG. 2, FIG. 3, FIG. 4 and FIG. 5, a folding grill stand 100 for easy storage according to the present invention includes a first support 10, a second support 20, a third support 30 and a plurality of lateral supports 40.

The first support 10 consists of at least one set of first horizontal rods 110 each of which includes a first side surface 111 and a second side surface 112. More specifically, the first horizontal rods 110 are fixed by a plurality of first vertical parts 120 so as to form the first support 10.

The second support 20 includes one set of second horizontal rods 210. More specifically, the second horizontal rods 210 are fixed by a plurality of second vertical parts 220 so as to form the second support 20. A first end portion 211 and a second end portion 212 of the respective second horizontal rod 210 are connected to the first side surface 111 in a foldable manner by a first rotating shaft 230 and a first bolt 240 respectively. Thereby the second support 20 can be extended while in use or folded for storage.

The third support 30 includes one set of third horizontal rods 310. More specifically, the third horizontal rods 310 are fixed by a plurality of third vertical parts 320 so as to form the third support 30. A third end portion 313 and a fourth end portion 314 of the respective third horizontal rod 310 are connected to the second side surface 112 in a foldable manner by a second rotating shaft 330 and a second bolt 340 respectively. Thereby the third support 30 can be extended while in use or folded for storage.

Figure 6A:
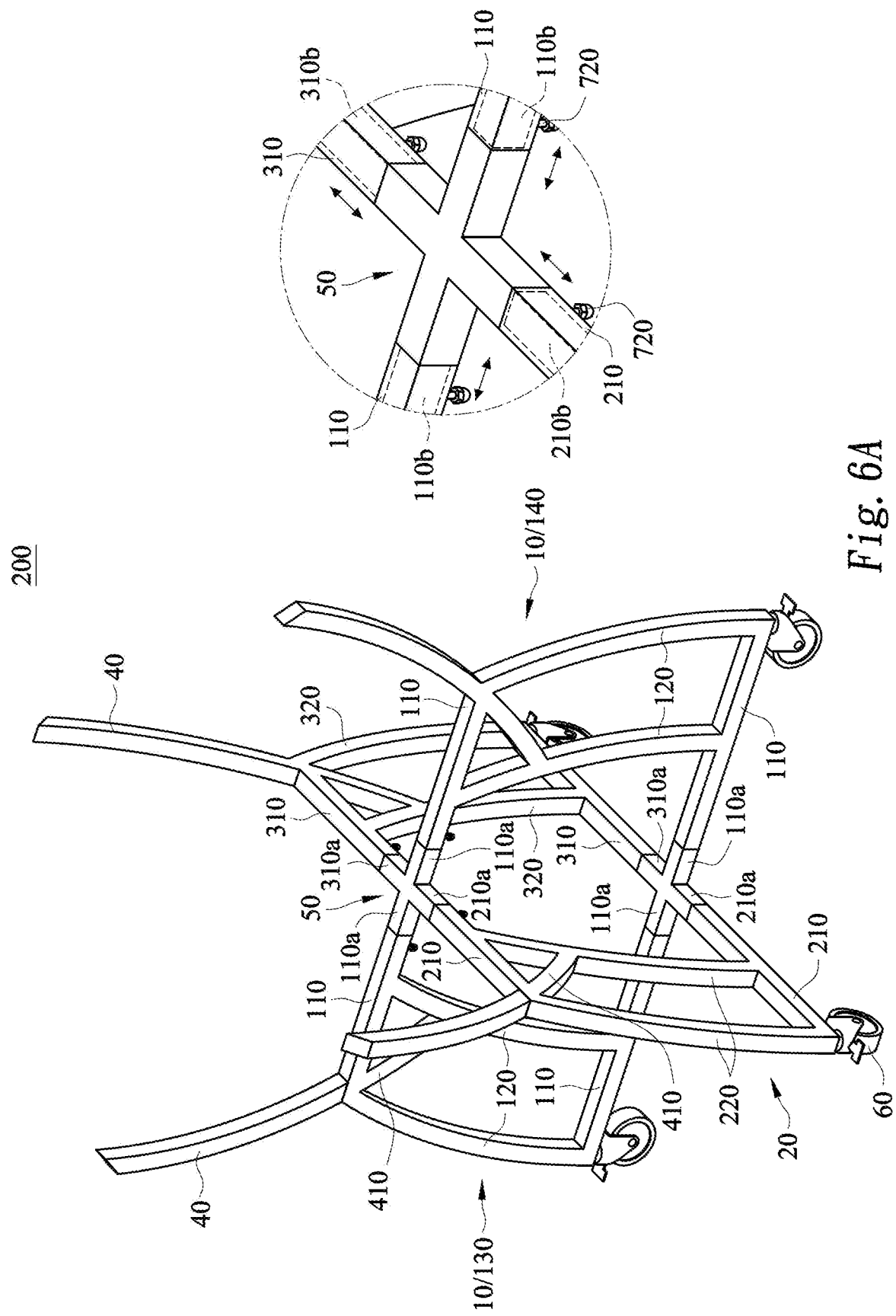
FIG. 6A shows a perspective view and a partial enlarged view of another embodiment of a folding grill stand structure with high storage convenience according to the present invention.

Refer to FIG. 6A, another embodiment of a folding grill stand 200 for easy storage according to the present invention consists of a first support 10, a second support 20, a third support 30, a plurality of lateral supports 40 and a pair of cross joints 50.

The first support 10 consists of a first rack 130 and a second rack 140, both are provided with one set of first horizontal rods 110. More specifically, the first horizontal rods 10 are fixed by a plurality of vertical parts 120 so as to form the first rack 130 and the second rack 140.

The second support 20 includes one set of second horizontal rods 210. More specifically, the second horizontal rods 210 are fixed by a plurality of second vertical parts 220 so as to form the second support 20.

The third support 30 includes one set of third horizontal rods 310. More specifically, the third horizontal rods 310 are fixed by a plurality of third vertical parts 320 so as to form the third support 30.

The cross joint 50 is composed of a pair of first joints 110b, a second joint 210b and a third joint 310b that are integrally connected to the first horizontal rods 110, the second horizontal rod 210 and the third horizontal rod 310 in a pluggable manner respectively, allowing quick release for warehouse, transportation, or storage and quick join while in use.

Besides the pluggable design mentioned above, refer to FIG. 6B, the cross joint 50 further includes a first rod 110a, a second rod 210a and a third rod 310a in order to provide the folding function.

The first rod 110a is composed of a first joint 110b formed on each of two ends thereof, a first side surface 111 and a second side surface 112.

The second rod 210a includes a second joint 210b at one end, and a first end portion 211 and a second end portion 212 at the other end thereof. The first end portion 211 and the second end portion 212 are connected to the first side surface 111 in a foldable manner by a first rotating shaft 230 and a first bolt 240 respectively. Thereby the second support 20 is extendable and foldable.

The third rod 310a includes a third joint 310b at one end, and a third end portion 313 and a fourth end portion 314 at the other end thereof. The third end portion 313 and the fourth end portion 314 are connected to the second side surface 112 in a foldable manner by a second rotating shaft 330 and a second bolt 340 respectively. Thereby the third support 30 is extendable and foldable.

All of the embodiments mentioned above have the same features that are further described below.

In order to protect or fix a vessel 90 effectively, a plurality of lateral supports 40 is arranged at the end portion of the outer side of a first support 10, a second support 20 and a third support 30 respectively.

Figure 5:
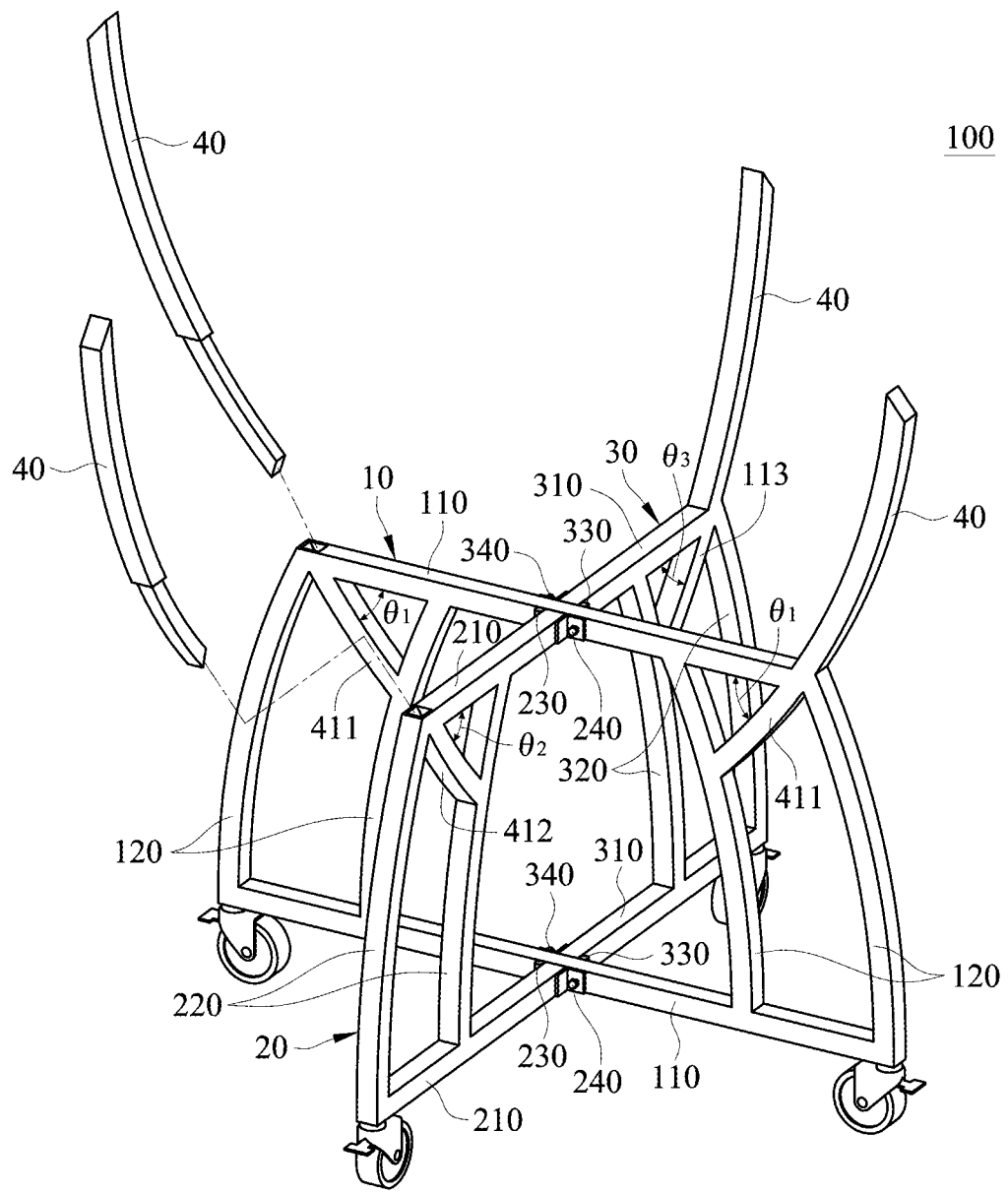
FIG. 5 is an explosive view of a part of lateral supports of an embodiment according to the present invention.

Referring to FIG. 5, for saving the storage space or allowing easy vertical placement of the vessel 90, at least one lateral sleeve 410 is formed by at least one extension part of each of the first support 10, the second support 20 and the third support 30. Each extension part corresponds to one of the lateral supports 40. Each lateral supports 40 is connected to the corresponding lateral sleeve 410 in a one-to-one and pluggable/movable manner. For example, a first lateral sleeve 411 is formed between each adjacent pair of first vertical parts 120, and a first angle $\theta_1$ is formed between one of the first horizontal rods 110 and each first lateral sleeve 411; a second lateral sleeve 412 is formed between the two second vertical parts 220, and a second angle $\theta_2$ is formed between one of the second horizontal rods 210 and the second lateral sleeve 412; and a third lateral sleeve 413 is formed between the two third vertical parts 320, and a third angle $\theta_3$ is formed between one of the third horizontal rods 310 and the third lateral sleeve 413.

In order to make the movement of the folding grill stand 100, 200 for easy storage more easily and conveniently, a plurality of wheels 60 is disposed under an end portion of the outer side of the first support 10, the second support 20 and the third support 30 in a one-to-one manner.

Figure 6B:
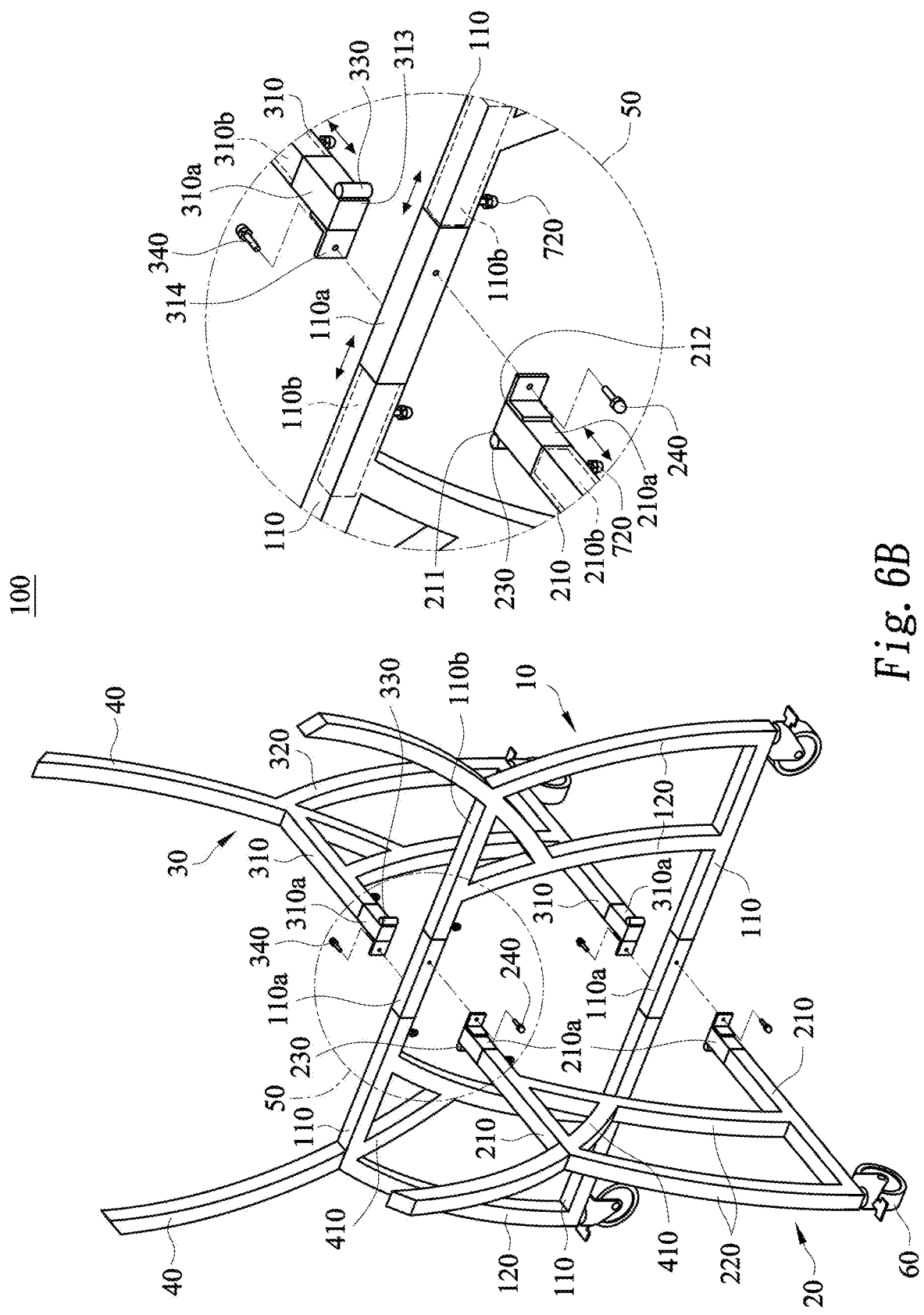
FIG. 6B is the embodiment in FIG. 6A with a folding function according to the present invention.

As the partial enlarged view shown in FIG. 6A and FIG. 6B, the first horizontal rod 110, the second horizontal rod 210, and the third horizontal rod 310 can be extendable by the first rod 110a in combination with the first joints 110b, the second rod 210a in combination with the second joint 210b, and the third rod 310a in combination with the third joint 310b respectively. After the extension/adjustment of the length, a fastening bolt 720 is used for fixing the first horizontal rod 110, the second horizontal rod 210, and/or the third horizontal rod 310. Thereby the present grill stand can be used in combination with vessels in different sizes.

Figure 6C:
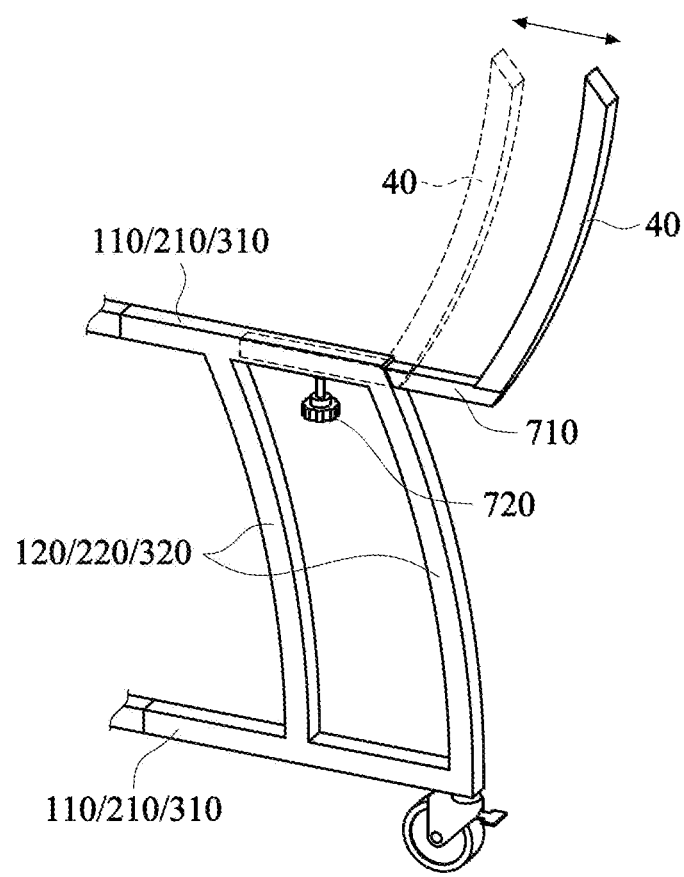
FIG. 6C is a partial view of an embodiment provided with an extension rod according to the present invention.
Figure 7A:
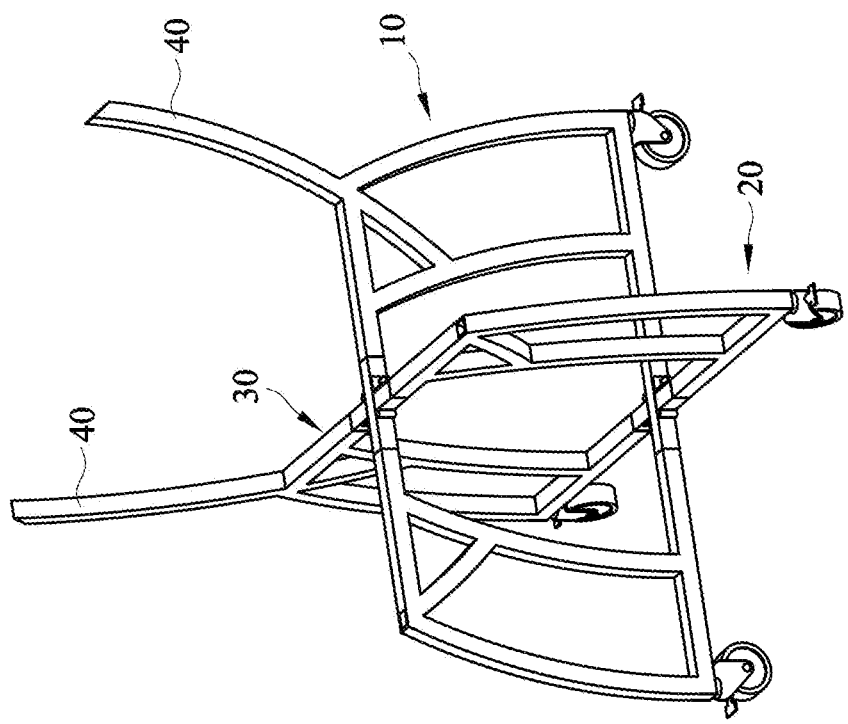
FIG. 7A is a schematic drawing showing an embodiment of a folding grill stand structure with high storage convenience in use according to the present invention.
Figure 7A:
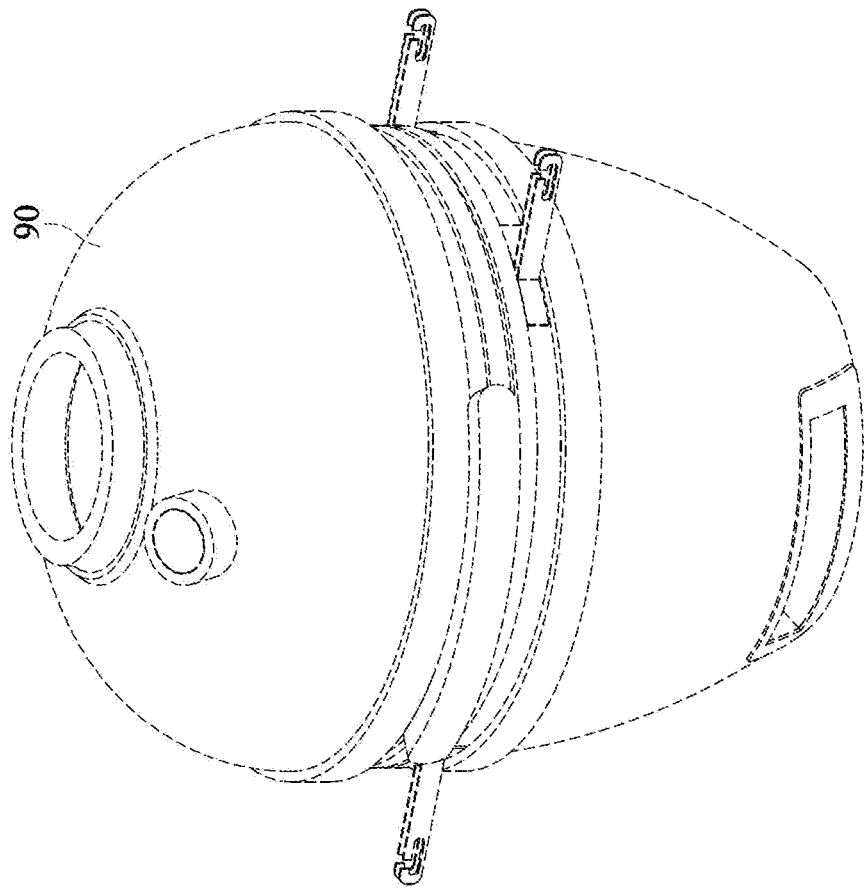
Figure 7B:
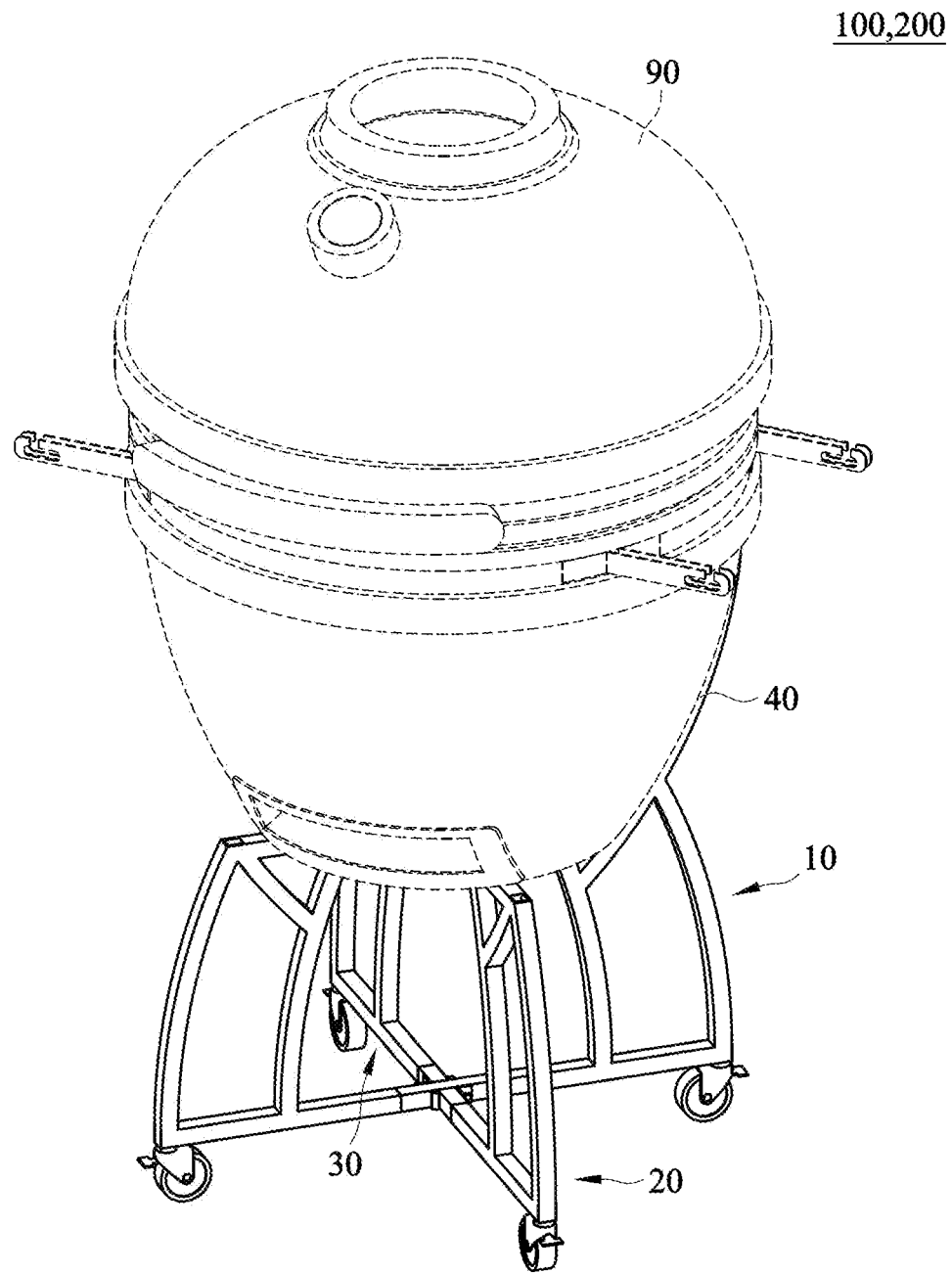
FIG. 7B is another schematic drawing showing an embodiment of a folding grill stand structure with high storage convenience in use according to the present invention.
Figure 7C:
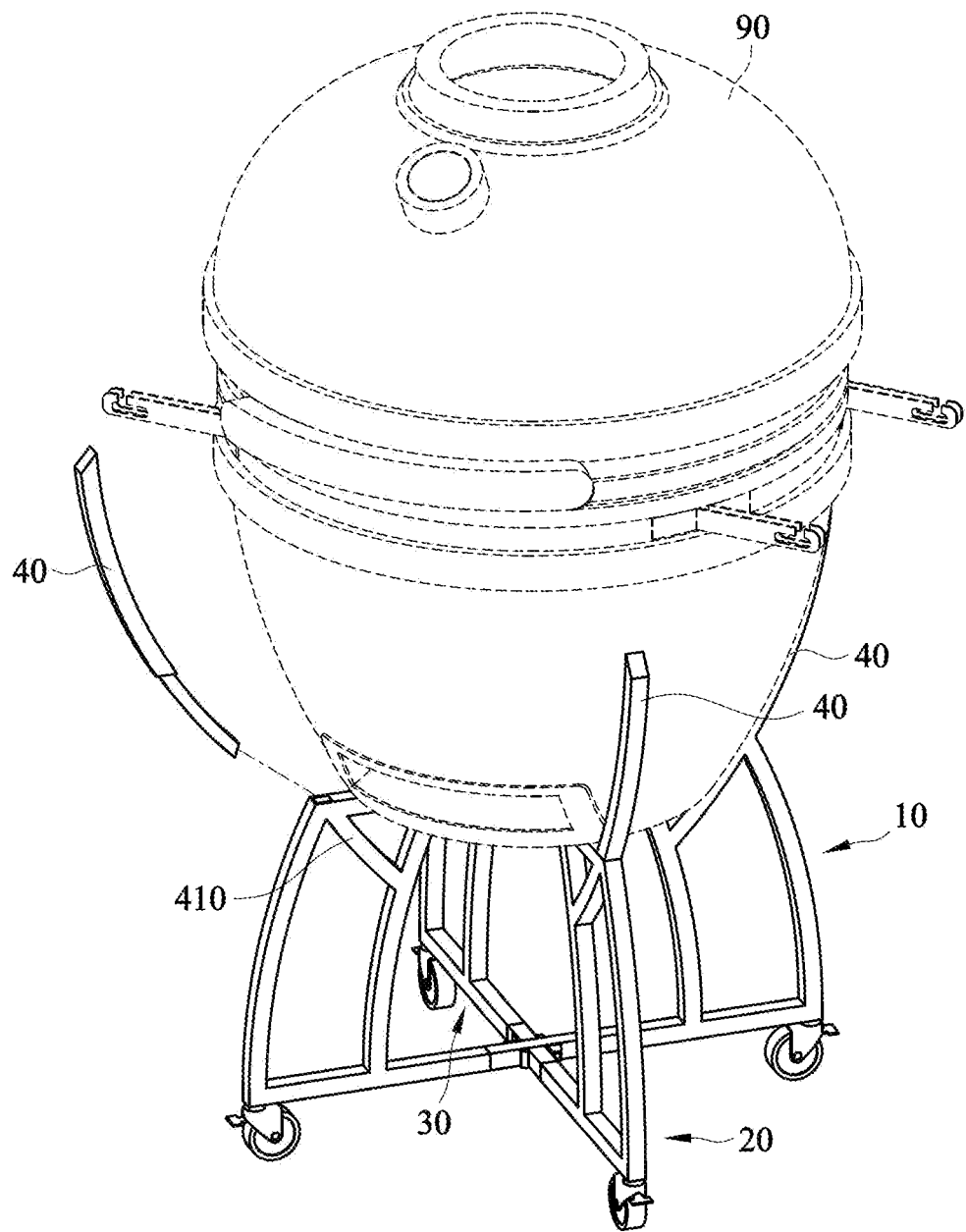
FIG. 7C is a further schematic drawing showing an embodiment of a folding grill stand structure with high storage convenience in use according to the present invention.
Figure 7D:
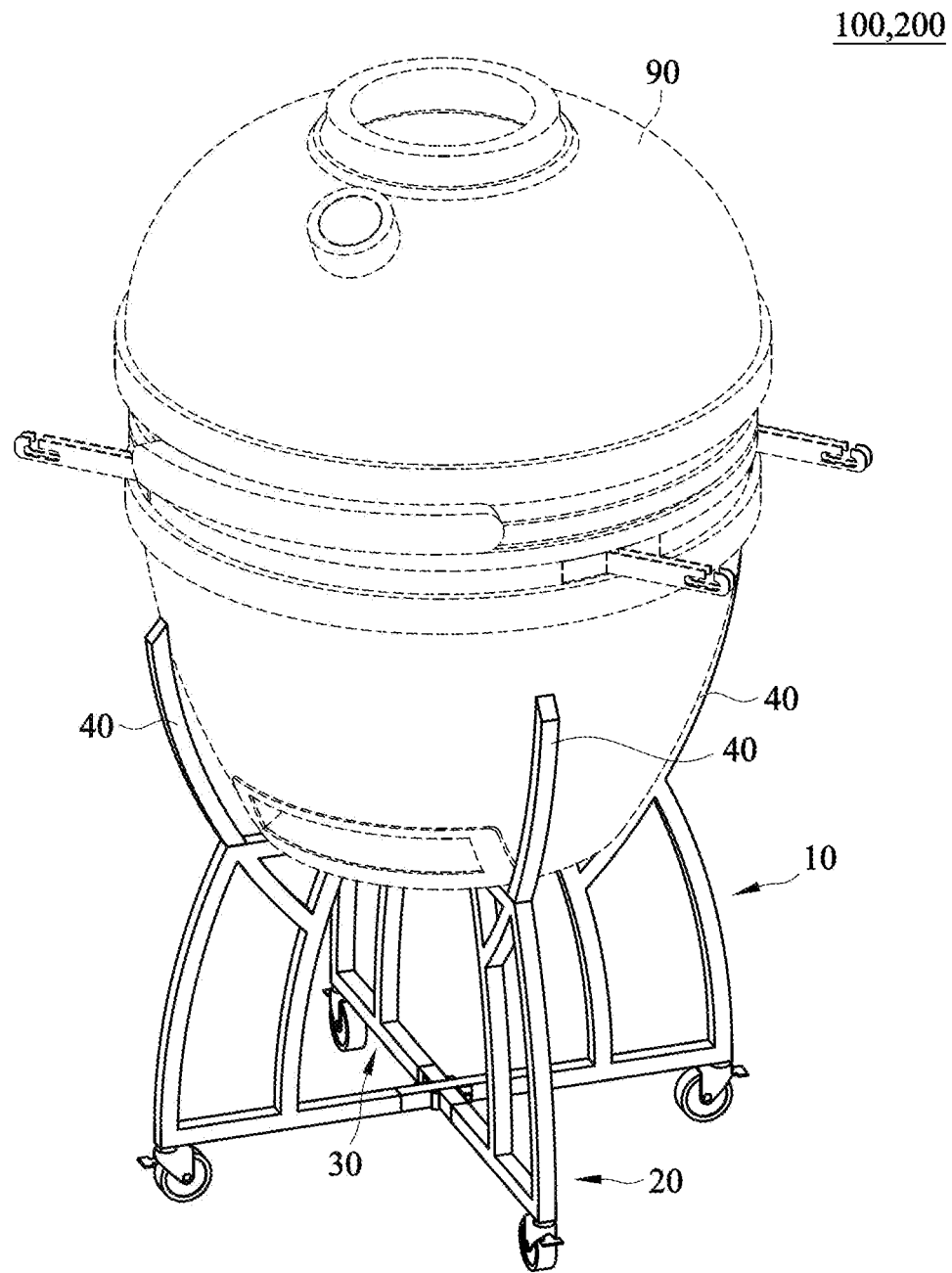
FIG. 7D is a further schematic drawing showing an embodiment of a folding grill stand structure with high storage convenience in use according to the present invention.

As shown in FIG. 6C, in order to be applied to vessels in different sizes, a first horizontal rod 110, a second horizontal rod 210, and a third horizontal rod 310 are provided with an extension rod 710 mounted therein respectively. Each lateral support 40 is fixed on one extension rod 710 so as to be moved horizontally and synchronously along with the extension rod 710. Thereby the function of being applied to vessels in different sizes is achieved.

In order to fix the extension rod 710 effectively, the first horizontal rod 110, the second horizontal rod 210, or the third horizontal rod 310 is provided with a fastening bolt 720 at the position corresponding to the extension rod 710. The extension rod 710 is locked by the fastening bolt 720 after being adjusted to the position required.

As shown in FIG. 7A, FIG. 7B, FIG. 7C, and FIG. 7D, while the folding grill stand 100, 200 for easy storage is in use, the second support 20 and the third support 30 originally folded are extended and fixed by bolts respectively. Or the first rack 130, the second rack 140, the second support 20 and the third support 30 are firstly connected into one part by a pair of cross joints 50. Then two lateral supports 40 are inserted into two adjacent lateral sleeves 410 respectively. Next the vessel 90 is placed on the grill stand. At last the rest two lateral supports 40 are inserted into the rest two adjacent lateral sleeves 410 respectively.

The above description is only the preferred embodiments of the present invention, and is not intended to limit the present invention in any form. Although the invention has been disclosed as above in the preferred embodiments, they are not intended to limit the invention. A person skilled in the relevant art will recognize that equivalent embodiment modified and varied as equivalent changes disclosed above can be used without parting from the scope of the technical solution of the present invention. All the simple modification, equivalent changes and modifications of the above embodiments according to the material contents of the invention shall be within the scope of the technical solution of the present invention.

What is claimed is:

1. A folding grill stand structure with high storage convenience comprising:
    a first support having one set of first horizontal rods each of which includes a first side surface and a second side surface, wherein the one set of first horizontal rods are fixed by two pairs of first vertical parts, a first lateral sleeve is formed between each said pair of first vertical parts, and a first angle is formed between one of the first horizontal rods and each said first lateral sleeve;
    a second support that includes one set of second horizontal rods; each of the second horizontal rods having a first end portion and a second end portion while the first end portion and the second end portion are connected to the first side surface in a foldable manner by a first rotating shaft and a first bolt respectively, wherein the one set of second horizontal rods are fixed by two second vertical parts, a second lateral sleeve is formed between the two second vertical parts, and a second angle is formed between one of the second horizontal rods and the second lateral sleeve;
    a third support having one set of third horizontal rods each of which includes a third end portion and a fourth end portion while the third end portion and the fourth end portion are connected to the second side surface in a foldable manner by a second rotating shaft and a second bolt respectively, wherein the one set of third horizontal rods are fixed by two third vertical parts, a third lateral sleeve is formed between the two third vertical parts, and a third angle is formed between one of the third horizontal rods and the third lateral sleeve; and
    a plurality of lateral supports connected to the two first lateral sleeves, the second lateral sleeve, and the third lateral sleeve in a one-to-one and pluggable/movable manner.

2. The folding grill stand structure as claimed in claim 1, wherein a plurality of wheels is disposed under an end portion of the outer side of the first support, the second support and the third support in a one-to-one manner.

* * * * *